Figure 1:
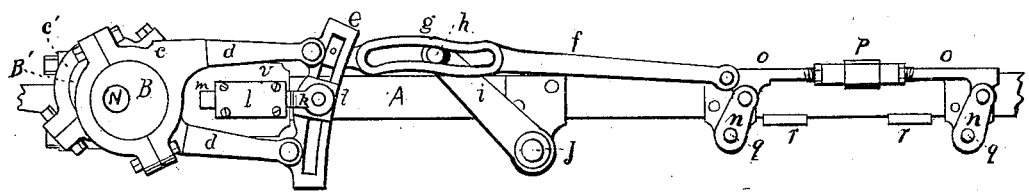

L. RANSOM.
VALVE GEAR OF STEAM ENGINES.

No. 250,284. Patented Nov. 29, 1881.

Witnesses,
E. A. Stanley
Walter C. Bush Jr

Inventor,
Louis Ransom.

UNITED STATES PATENT OFFICE.

LOUIS RANSOM, OF STRATFORD, NEW YORK.

VALVE-GEAR OF STEAM-ENGINES.

SPECIFICATION forming part of Letters Patent No. 250,284, dated November 29, 1881.

Application filed March 13, 1879.

*To all whom it may concern:*

On the 31st day of October, 1876, Letters Patent of the United States were issued to me on improvements in engines for steam street-cars, such letters being numbered 183,970. In the specification of said Letters Patent the invention herein given was described, and it was represented in the drawings, and the intention of applying for a patent at some future time was therein declared; therefore, Be it known that I, LOUIS RANSOM, of Stratford, in the county of Fulton and State of New York, have invented a new and useful Improvement in the Valve-Gear of Steam-Engines, especially engines designed to propel steam street-cars, of which the following is a specification.

The invention relates mainly to that part of the valve-gear designed to reverse the motion of the engine.

Heretofore the great majority of American steam-engines, when reversible, have been furnished with shifting links which, in either the backing or forward gear, were dropped so low that when placed under the floor of a street-car they would come so near the ground as to be liable to frequent breakage and to certain and constant injury from dust. Were stationary links to be used the objection of nearness to the ground would be equally valid against the sustaining link and arm which connect the radius-bar with the tumble-shaft. Furthermore, the sustaining link or rod by which the link proper is held in place being pivoted at one end while the link swings upon the other, an arc is described, which in either the forward or backing motion seriously increases the slip of the link-block, and as the radius-bar is commonly supported by a sustaining-link in a similar way, the objection of causing undue slip in the block holds equally against it. As in engines designed to propel street-cars, it is desirable that the machinery be protected from dust, and as the shifting or stationary link, as now made and operated, would require a casing quite low, it would, of course, be much exposed to injury from obstacles in the road.

The object of my invention is, first, to provide a valve-gear which shall be well raised from the ground; second, whose distance from the ground shall not vary in either the forward or backing motion; third, which, while supporting the link firmly in place, shall supplant the old sustaining-link on both links and radius-bars and reduce the slip of the block to the smallest possible quantity; and, fourth, which is so compact that it may be easily and securely cased in the shallowest possible engine-casing.

Figure 2:
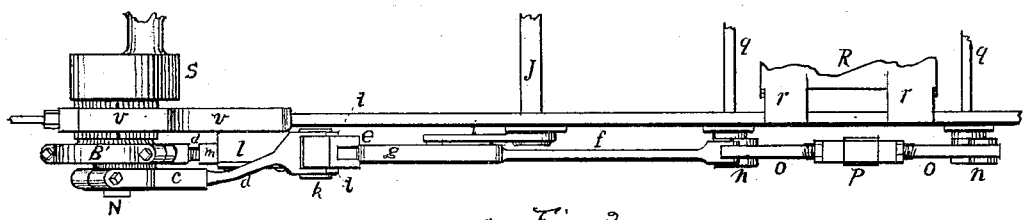
Figure 3:
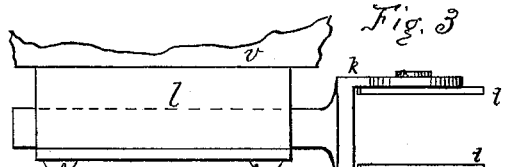
Figure 4:
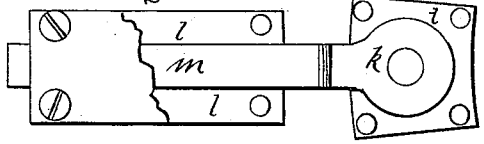
Figure 5:

In the accompanying drawings, Figure 1 is a side elevation of the valve-gear; Fig. 2, a plan of the same, or top view; Fig. 3, a top, and Fig. 4 a side, view of the link-fork $m\ k$, with its trunnion-plates $t\ t$ and its guide $l$; and Fig. 5, a trunnion-plate.

Like letters refer to like parts in each figure.

The link $e$, actuated by the eccentrics B and B′, is supplied with trunnion-plates which are secured to each of its sides, the trunnions being on the central line between the ends of the link, the link being split to afford access and motion to the head of the radius-bar $f$. These trunnions, when secured to the link, are joined to the link-fork $k\ m$ at $k$, so the link may easily vibrate on its center under the action of the eccentrics. This link-fork terminates in the straight bar $m$, which, sliding freely in its guide $l\ l$, accepts the motion arising from the angular advance of the eccentrics, sustains the link firmly in place while dispensing with the old sustaining-link.

In the radius-bar $f$ is the slot $g$. This slotted part of the radius-bar, when actuated by the link, moves freely over the pin $h$ at the end of the arm $i$, this arm being fixed on the tumble-shaft J, which, actuated by the reversing-bar in the hands of the engineer, through suitable connections reverses the engine or cuts off by setting the link-block at any required point in the link. The tumble-shaft J is placed in such relation to the radius-bar that in the backing motion only that half of the slot $g$ farthest from the link moves over the pin $h$, while in the forward motion only the half of the slot nearest the link rides on the pin $h$. Now the 1orm of that half of the slot nearest the link and designed for the forward gear imitates the movement of the bar over this space in the forward motion of the engine, while the other half imitates the movement of the bar in the backing motion, thus reducing the slip of the link-block to the smallest possible quantity. The radius-bar at its other extremity is jointed to the parallel valve-rod $o\ o$, which, jointed to the valve-arms $n\ n$, actuates the valves, that are of the round or oscillating kind, through their spindles $q\ q$.

This entire valve-gear, excepting the eccentrics, is firmly secured to the frame of the engine A, the guide $l\ l$ of the link-fork being part of the malleable head $v$. It is very compact, is easily incased without increasing the depth of the casing beyond what would be required for the engine alone, while the slip of the link-block is reduced to a minimum.

What I claim is—

1. The combination, with the driving-shaft, eccentrics B B′, and the eccentric-rods, of the link $e$, trunnion-plates $t\ t$, link-fork $m\ k$, guide $l\ l$, slotted radius-bar $f$, pin $h$, arm $i$, and tumble-shaft J, substantially as described.

2. The combination, with the driving-shaft, eccentrics, eccentric-rods, and link, of the slide or fork $m\ k$, pivoted to the link, and the guide $l\ l$, whereby the link is supported while the slide is moved toward and from the axis of the driving-shaft by reason of the angular advance of the eccentrics, substantially as described.

3. The combination, with the valve-rod $o\ o$, link $e$, and reversing-arm $i$, of the radius-bar $f$, engaging with the link and valve-rod, and having the slot $g$ curved as described, and engaging with the pin $h$ of the reversing-arm, substantially as described.

LOUIS RANSOM.

Witnesses:
EDMUND T. COLE,
ISAAC RANSOM.